US012532040B1

(12) United States Patent
Mendelson et al.

(10) Patent No.: US 12,532,040 B1
(45) Date of Patent: Jan. 20, 2026

(54) CONTEXT-BASED CONTROL INPUTS FOR A DEVICE

(71) Applicant: Amazon Technologies, Inc., Seattle, WA (US)

(72) Inventors: Jonathan Daniel Mendelson, San Carlos, CA (US); Jerry Oh, San Jose, CA (US); Samantha Caplan, Seattle, WA (US); Brandon Fluegel, Denver, CO (US); Daniel J. Sanchez, Sunnyvale, CA (US); Marcelo Alonso Mejia Cobo, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/075,241

(22) Filed: Dec. 5, 2022

(51) Int. Cl.
*H04N 21/422* (2011.01)
*H04N 21/41* (2011.01)

(52) U.S. Cl.
CPC . *H04N 21/42222* (2013.01); *H04N 21/41265* (2020.08)

(58) Field of Classification Search
None
See application file for complete search history.

(56) References Cited

U.S. PATENT DOCUMENTS

2013/0205212 A1* 8/2013 Sinha .................. H04N 21/432
715/719

* cited by examiner

*Primary Examiner* — Samira Monshi
(74) *Attorney, Agent, or Firm* — Kilpatrick Townsend & Stockton LLP

(57) ABSTRACT

Context-based control inputs for a device are described herein. In an example, a device presents a first user interface (UI). The device determines, while the first UI is presented, a first user interaction corresponding to a first instance of a user input with the device. The device determines a first context associated with the first user interaction and a first control input based on the first user interaction and the first context. The device causes execution of a first action based on the first control input. The device determines a second user interaction with the device that corresponds to a second instance of the user input. The device determines a second context associated with the second user interaction and determines a second control input based on the second user interaction and the second context. The device causes execution of a second action based on the second control input.

20 Claims, 12 Drawing Sheets

CONTEXT-BASED CONTROL INPUTS FOR A DEVICE

BACKGROUND

A device can be configured to content to users. The content can be organized in a menu of user interface elements. A user interaction with a user interface element results in an execution of a content-related action by the device.

BRIEF DESCRIPTION OF THE DRAWINGS

Various embodiments in accordance with the present disclosure will be described with reference to the drawings, in which.

DETAILED DESCRIPTION

Figure 1:
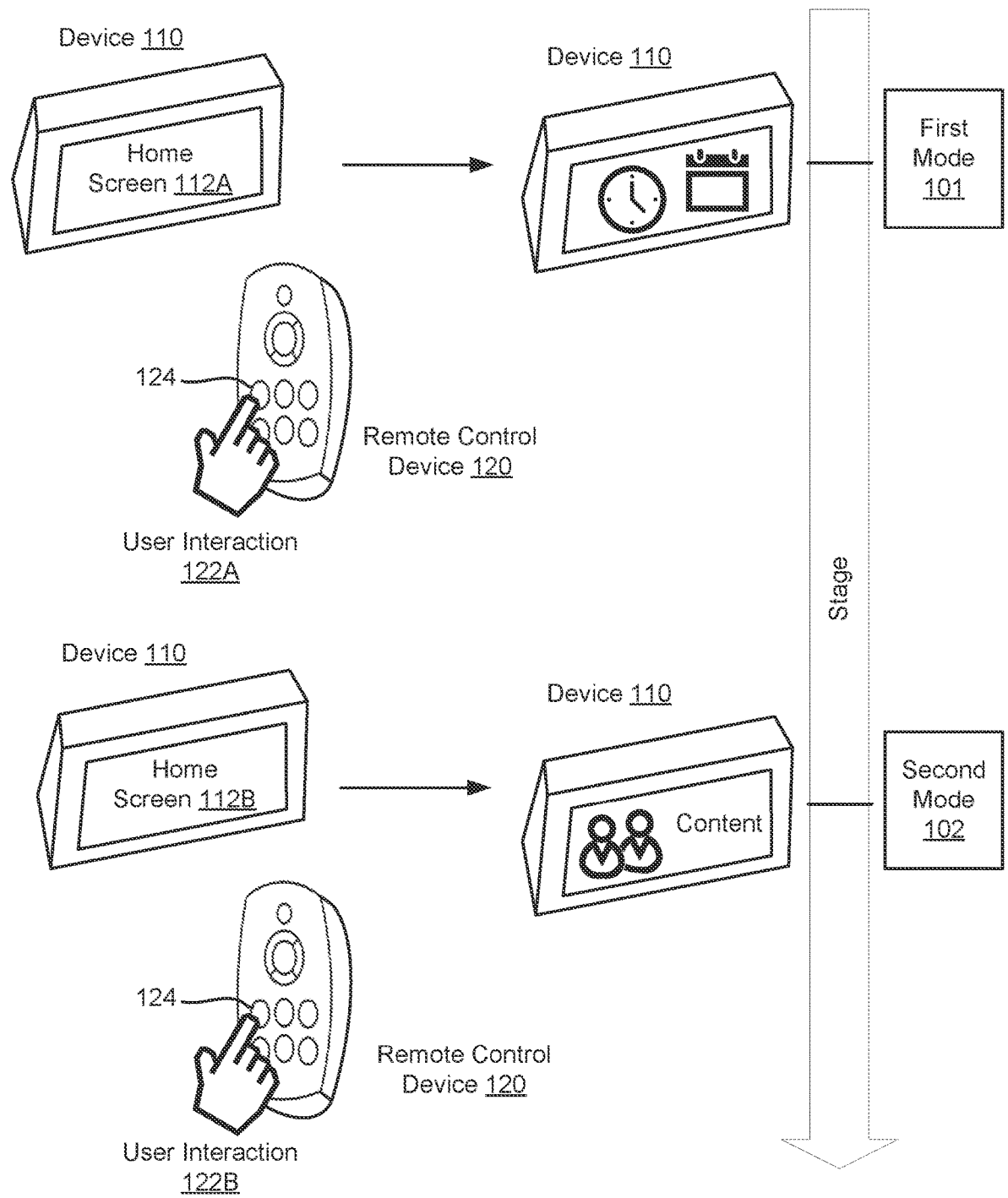
FIG. 1 illustrates examples of modes related to context-based control inputs for a device, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, context-based control inputs for a device. A device may perform various actions based on signals received via one or more input modalities and representing user inputs. For instance, the input modalities can support speech input, touchscreen input, and/or a remote control input. In the case of remote control input, the device may be in communication with a remote control device having selectable buttons. The action that is performed in response to a particular user input (e.g., button selection, speech input, or touchscreen input) can be based on a context associated with any of the device, another device, a user, and the like. Depending on the context, user interactions for the same type of user input (e.g., the selection of the same button on the remote control device) can result in the execution of different actions. In particular, the device can receive data that represents user input, determine the context, and translate the user input into a control input based on the context. The control input is then used to determine a relevant action and the device can then execute this action.

In an example, while presenting a first user interface, the device may receive first data indicating a first user interaction with the first user interface, where this user interaction is a first instance of a user input (e.g., a first selection of a button). The device can then determine a first context associated with the first user interaction, such as a user context, a user interface context, an application context, and the like. Based on the first data and the first context, the device can determine a first control input and cause an execution of a first action based on the first control input. For instance, the device may navigate to a page of the first user interface, navigate to a different position of the first user interface, launch an application, present a second user interface, or send a command to another device for executing an action based on the first control input. Further, the device can receive second data indicating a second user interaction, where this user interaction is a second instance of the same user input (e.g., a second selection of the button). Here, the device can determine a second context that is different from the first context. Accordingly, even though the two user interactions are for the same type of user input, the device can determine, based on the second context, a second control input that is different from the first control input. As a result, the device can execute a different action that is associated with the second control input.

To illustrate, consider an example of a device that provides a first mode for a television experience and a second mode for a multimodal experience. Each mode can be associated with a unique user interface usable to perform different actions associated with the corresponding experience (e.g., to stream movies in the television experience, and to launch non-movie application in the multimodal experience). To operate in the first mode, the device can execute a first application that presents a first user interface for the television experience. To operate in the second mode, the device can execute a second application that presents a second user interface for the multimodal experience. The device includes a touchscreen display and supports multiple input modalities, such as a remote control input modality, a speech input modality, a touchscreen input modality in both modes. The device can also store data indicating a mapping between user inputs and contexts to control inputs. While operating in the first mode, the device can receive, from a remote control device, a first signal (e.g., a BLUETOOTH signal) indicating that a home button of the remote control device has been selected. First data can be generated indicating the selection of the home button. Further, the device can determine a first context associated with when the first signal was received. The first context indicates a position of the user focus in the first user interface, where this position corresponds to a tile representing a movie and selectable to stream the movie. Based on the first data and the first context, the device can determine a first control input indicated in the mapping: a navigation to a home screen of the television experience. The device can then present the home screen while still operating in the first mode. While this home screen is presented, the device can receive a second signal indicating a second selection of the home button. Here, the device generates second data indicating the selection of the home button and determines a second context. Whereas the second data is the same as the first data (e.g., both indicating the selection of the home button), the second context is different from the first context. In particular, the second context indicates that the user focus is the home screen of the television experience. Based on the second signal and the second data, the device can determine a second control input indicated in the mapping: a navigation to a home screen of the multimodal experience. Accordingly, the device can switch from operating in the first mode to operating in the second mode (e.g., by terminating or backgrounding the first application and by launching or foregrounding the second application) and present the home screen of the multimodal experience in the second user interface.

Embodiments of the present disclosure provide several technical advantages over conventional devices. For instance, the embodiments provide a device capable of switching between operational modes, presenting corresponding user interfaces in support of different experiences, and dynamically adjusting types of user inputs to control inputs that trigger actions based on contexts. Because dynamic adjustments are performed, the overall user interface experience can be improved.

FIG. 1 illustrates examples of modes related to context-based control inputs for a device 110, according to embodiments of the present disclosure. The device 110 can be a display device (e.g., a device that includes a display). In an example, the device 110 includes a set of microphones capable of receiving speech inputs and a touchscreen display capable of receiving touchscreen inputs. The device 110 can also be coupled with a remote control device 120 (e.g., wirelessly) to receive remote control inputs therefrom (e.g., in the form of wireless signals). The device 110 can process data corresponding to each type of user inputs (e.g., speech, touch screen, or remote control device-based) to at least control functionalities of the device 110. The functionalities include the execution of content-related actions (e.g., to stream a movie, to stream music, to launch an application on the device 110, etc.) and device-related actions (e.g., to control another device, to launch an application on another device or a server, etc.). In particular, the device 110 includes one or more processors, one or more memories storing computer-readable instructions, one or more network interfaces, and/or other computing components configured to provide the functionalities described herein.

In an example, the device 110 can support multiple modes, each of which providing a user interface with functionalities specific to the mode. Generally, a mode represents an operational mode of the device 110, where device 110 can provide functionalities based on the operational mode and such functionalities can be interacted with via a user interface the device 110 presents specifically for the operational model. The multiple modes may be supported by a single operating system. In such instances, a first mode can be provided by the single operating system (e.g., by a home application of the single operating system), whereby a first user interface is associated with a first home screen that the operating system presents. A second mode can be provided by an application other than the operating system, whereby a second user interface is associated with a home screen of the application. Alternatively, each of the first mode and the second mode is associated with a different application, where such applications are non-operating system applications. Or the device 110 may have separate operating systems, where each operating system provides one of the two modes. In the interest of clarity of explanation, two modes and two user interfaces are described in the present disclosure. Nonetheless, the embodiments are not limited as such and can similarly and equivalently apply to a larger number of modes and/or user interfaces. Generally, a user interface of a mode represents an interface for a user to interact with an operating system or an application that provides the mode, as the use case may be, and can include a home screen and application interfaces, where the home screen shows an arrangement of user interface elements (e.g., in the form of a menu) for launching other applications and/or triggering the execution of actions (e.g., system actions), whereas an application interface shows actions that can be triggered for a specific application.

While operating in a first mode 101, the device 110 can provide a multimodal experience. As illustrated in FIG. 1, in the first mode 101, the device 110 can present a first user interface that provides home screen 112A for a first set of applications on the touchscreen display. The first set of applications may include a calendar application, audio content applications, a temperature control application, a reminder application, and the like. Indicators of some or all of the first set of applications can be presented and selectable from the home screen 112A. The first user interface can be controllable by one or more modalities, such as by input from the remote control device 120, touchscreen input, and/or speech input.

While operating in a second mode 102, the device 110 can provide a television experience. In the second mode 102, the device 110 can present a second user interface that provides home screen 112B for a second set of applications on the touchscreen display. The second set of applications may include content streaming applications, cable television applications, and the like. Indicators of some or all of the second set of applications can be presented and selectable from the home screen 112B. The second user interface can be controllable by one or more modalities, such as by input from the remote control device 120, touchscreen input, and/or speech input.

While operating in one of the two modes 101 or 102, the device 110 can receive first data indicating a first user interaction with a user interface of the mode 101 or 102. Depending on the first data and a first context at the time of when the data is received, the device 110 can determine a first control input that then causes the execution of an action. While still operating in the same mode 101 or 102, or upon a switch to the other mode, the device 110 can receive second data indicating a second user interaction. The first user interaction and the second user interaction can correspond to the same type of user input. For example, the two user interactions can correspond to the selection of the same button on the remote control device 120, same gesture on the touchscreen display, or the same speech utterance (e.g., the same set of words that the user repeats). However, a second context at the time when the second data is received can be different from the first context. As such, the second data is mapped to a second control input based on the second context, wherein this control input is different from the first control input.

FIG. 1 illustrates an example of this dynamic mapping of the same type of user input to different control inputs based on a contextual change. In the illustration of FIG. 1, the device 110 is initially operated in the first mode 101 and subsequently operated in the second mode 102 (as shown with the vertical arrow). Of course, embodiments of the present disclosure are not limited to this sequence of operations. In particular, while operating in the first mode 101, the device 110 may receive a first signal indicating a first user interaction 122A with the device 110 via the remote control device 120: a selection of a button 124 of the remote control device 120. The device 110 can determine a first context that indicates the first user interface is presented and a first user interface position (e.g., a home screen 112A). Data corresponding to the signal indicating that the button 124 has been selected and the first context can be mapped to a first control input, and in response to the first control input the device 110 can execute a first action associated with the first user interface. For instance, the device 110 can display a calendar application of the first set of applications in response to the first control input.

Subsequently, the device 110 operates in the second mode 102. While operating in the second mode 102, the device 110 may receive a second signal indicating a second user interaction 122A with the device 110 via the remote control device 120: another selection of the button 124. The device 110 can determine a second context that indicates the second user interface is presented and a second user interface position (e.g., a home screen 112B). Data corresponding to the second signal indicating that the button 124 has been selected and the second context can be mapped to a second control input, and in response to the second control input the device 110 can execute a second action associated with the second user interface. For instance, the device 110 can display a content streaming application of the second set of applications in response to the second control input.

Figure 2:
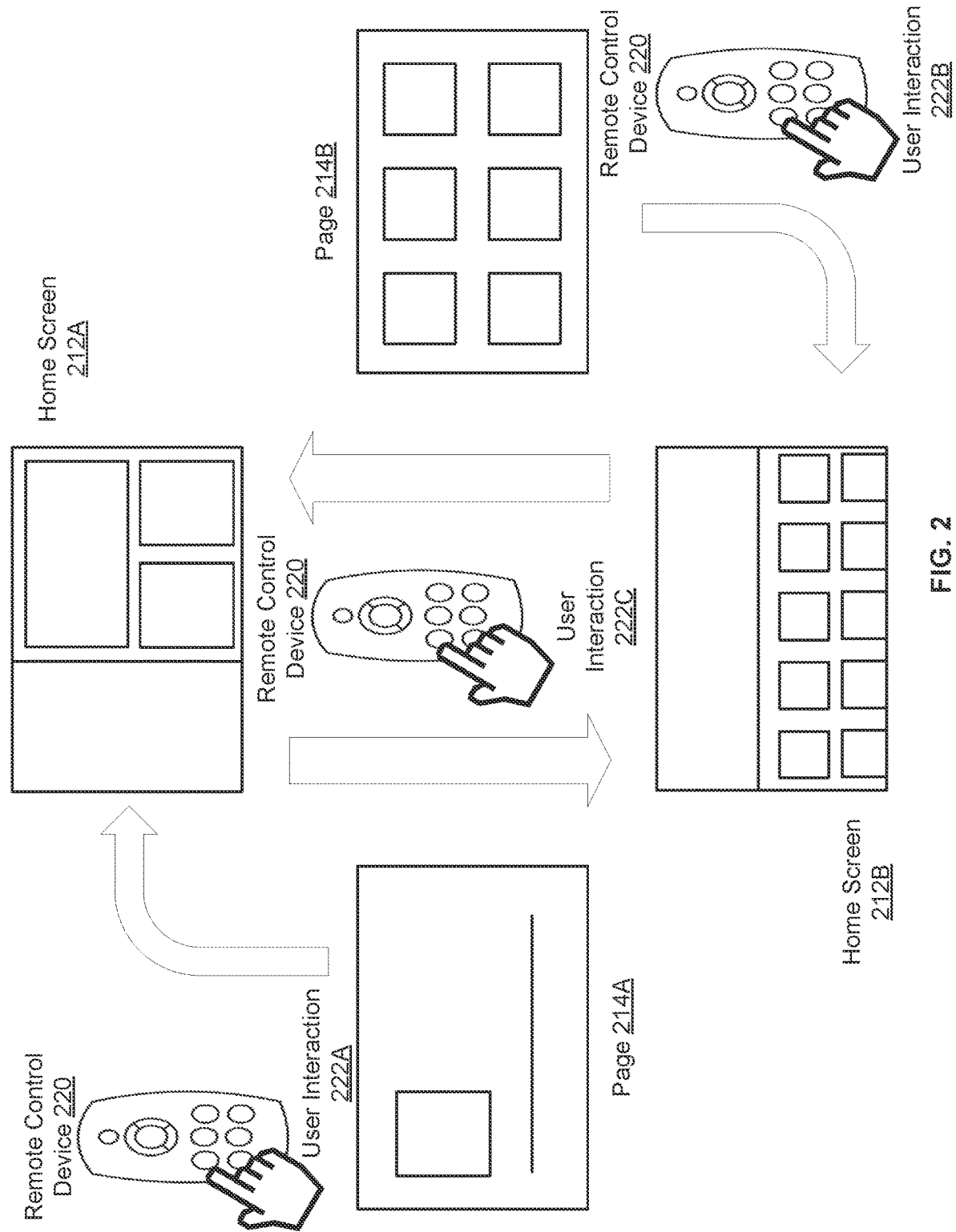
FIG. 2 illustrates examples of context-based control inputs for a device, according to embodiments of the present disclosure.

FIG. 2 illustrates examples of context-based control inputs for a device (e.g., the device 110 of FIG. 1), according to embodiments of the present disclosure. Actions performed by the device can vary depending on a number of contexts at the time when a user input is received. One example context is the mode of operation (or, equivalently, a user interface of the mode) and position of the user focus in the user interface.

Referring back to the example modes of FIG. 1, the first mode 101 can correspond to a first user interface that includes a home screen 212A and a page 214A. The home screen 212A can present user interface elements (e.g., tiles, icons, etc.) in a particular arrangement (e.g., in a menu) and selectable to launch, among other things, applications available in the first mode 101. The page 214A can provide an interface to a launched application, while the device 110 is operating in the first mode. Similarly, the second mode 101 can correspond to a second user interface that includes a home screen 212B and a page 214B. The home screen 212B can present user interface elements (e.g., tiles, icons, etc.) in a particular arrangement (e.g., in a menu) and selectable to launch, among other things, applications available in the second mode 102. The page 214B can provide an interface to a launched application while the device 110 is operating in the second mode 102. The applications, the arrangements of user interface elements, the layout of the home interfaces, the presentation styles of the user interface elements (e.g., tiles versus icons), and/or other parameters for interacting with the device 110 can differ between the first mode 101 and the second mode 102.

The context-based controls are described in connection with the two user interfaces herein. In particular, if the page 214A is displayed (e.g., as an interface to a music streaming application), and a user interaction 224A is received (e.g., a selection of a home button on a remote control device 220 or a speech utterance of "home"), the device may execute an action to navigate from the page 214A to the home screen 212A. In comparison, if a page 214B is displayed (e.g., as an interface to a movie streaming application) and a user interaction 224B of the same type as the user interaction 224A is received (e.g., another selection of the home button or another speech utterance of "home"), the device may execute an action to navigate from the page 214B to the home screen 212B.

From the home screen 212A of the first user interface or the home screen 212B of the second user interface, a user interaction 222C of the same type as the user interactions 224A and 224B (e.g., yet another selection of the home button or yet another speech utterance of "home") can cause the device to execute an action to switch to the other mode (e.g., from the first mode 101 to the second mode 102 or vice versa as the case may be) and present the other user interface (e.g., the second user interface when switching to the second mode 102 or the first user interface when switching to the first mode 101). That is, if the device is displaying the home screen 212A and receives the user interaction 222C, the device can then navigate to the home screen 212B. Alternatively, if the device is displaying the home screen 212B and receives the user interaction 222C, the device can then navigate to the home screen 212A.

Figure 3:
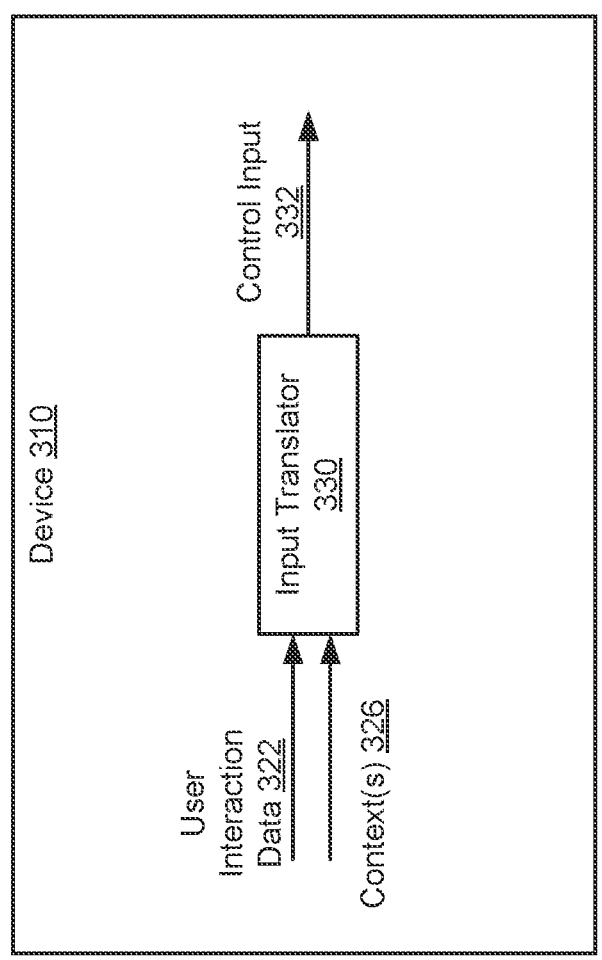
FIG. 3 illustrates components of a device for determining context-based control inputs, according to embodiments of the present disclosure.

FIG. 3 illustrates components of a device 310 for determining context-based control inputs, according to embodiments of the present disclosure. The device 310 is an example of the device 110 in FIG. 1. The device 310 includes an input translator 330 that receives data 322 indicating a user interaction and one or more contexts 326 associated with a presentation of the user interface. The user interaction can be a selection of a button of a remote control device (e.g., remote control device 120 in FIG. 1), speech input received by one or more microphones of the device 310, or a touchscreen input to a touchscreen display of the device 310. The user interaction can be associated with the context(s) 326 (e.g., the association can be time-based, where the context(s) 326 can include any or a combination of a device context, a user context, an application context, another device context, etc. at the time of the user interaction). The user interaction may result in a control input 332 based on the context(s) 326. The same button selection, speech input (e.g., the same set of words), or touchscreen input may result in a different control input based on a different context associated with this other user interaction.

The context(s) 326 can be a user context (e.g., a user proximity, a user presence, or a user view of the device 310), a device context, a user interface context, an application context, and/or an environmental context (e.g., data about an environment that surrounds the device 310, such as temperature data, presence data, activity data, etc.). For example, the context(s) 326 may be a user interface context that includes an identifier of the user interface, an identifier of a presented page (e.g., a home screen or an application page), and/or a position of a user focus in the user interface. As a particular example, the context(s) 326 can indicate a first user interface position of a first page is presented in a first user interface. Based on the data 322 and the context(s) 326, the input translator 330 can determine the control input 332 that is used by the device 310 to determine an action that is to be performed. The control input 332 is not an action that the device 310 executes but is rather an input that is usable by the device 310 to determine the action.

In an example, the input translator 330 can lookup mapping data that maps user interaction and context pairs to a plurality of predetermined control inputs. The mapping data may be predefined. As an example, the mapping data may be a table. For instance, the table may map a selection of a particular button of the remote control device and the context(s) 326 of the device 310 presenting the first user interface position of the first page in the first user interface to the control input 332 of a navigation to a home screen of the first user interface. Other combinations of contexts and user interactions may be mapped to other navigations of user interface(s), no navigation being executed, an action being executed by another device (e.g., a television, a thermostat, a smart speaker, etc.) in the table.

In another example, the mapping data may be if/then rules that the input translator 330 can lookup to determine the control input 332. The "if" part of a rule can correspond to type of user interaction and the context(s) 326 and the "then" part of the rule can indicate the control input 332 from a plurality of predetermined control inputs.

Alternatively, the input translator 330 may be a machine learning model, such as a classifier, trained to determine control inputs based on user interactions and contexts. Training the machine learning model can involve the machine learning model receiving training data of historical user interactions and contexts and outputting predicted control inputs until a loss function associated with the machine learning model is minimized. For instance, the training can be supervised, where for a given user interaction and context pair, an optimum control input is defined and labeled for use as ground truth. The machine learning model is trained to predict, for each pair of user interactions and contexts, a control input, and the loss function is computed based on a difference between the predicted control input and the ground truth-labeled control input for that user interaction and context pair. In particular, the loss function can include a penalty (or, more generally, a cost), where the value of the penalty depends on the difference.

Once trained, the input translator 330 receives the data 322 and the context(s) 326 and generates the control input 332 that is to be used to determine an action that is to be executed. The device 310 can execute the action or cause another device to execute the action by sending a command to the other device.

Figure 4:
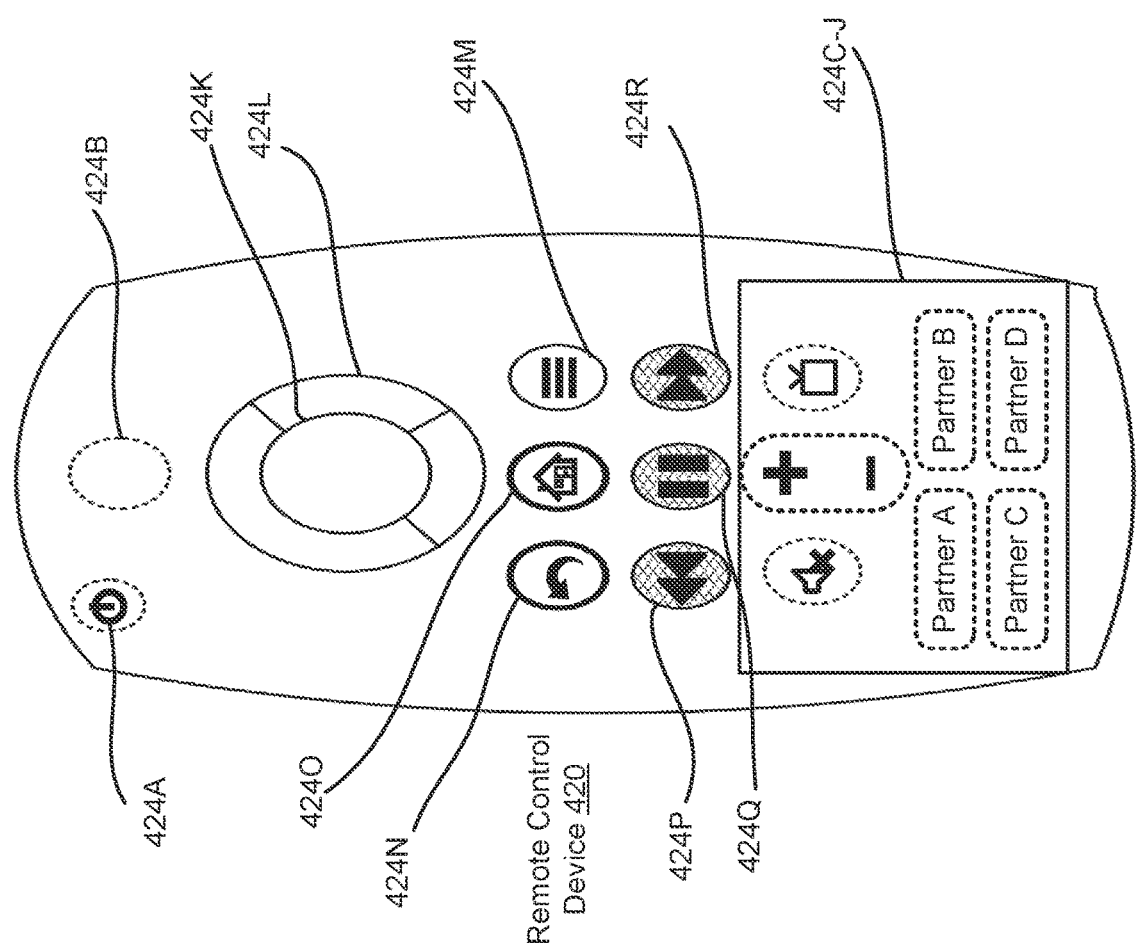
FIG. 4 illustrates an example of a remote control device associated with context-based control inputs, according to embodiments of the present disclosure.

FIG. 4 illustrates an example of a remote control device 420 associated with context-based control inputs, according to embodiments of the present disclosure. The remote control device 420 is an example of the remote control device 120 in FIG. 1. The remote control device 420 is illustrated as including buttons 424A-R, but other examples of remote control devices may include more or fewer buttons. Additionally, or alternatively, rather than using hard buttons, soft buttons can be used (e.g., implemented via software and presented on a graphical user interface of the remote control device 420).

The buttons 424A-R are grouped into categories based on their functionality. Table 1 describes the categories of buttons, definitions of the categories, and the associated buttons. In FIG. 4, buttons 424A-J correspond to global buttons, buttons 424K-M correspond to contextual navigation buttons, buttons 424N-O correspond to global navigation buttons, and buttons 424P-R correspond to media/transport buttons.

TABLE 1

| Category | Definition | Buttons |
| --- | --- | --- |
| Global | Available actions that perform the same result anywhere in the interface. | Power, Speech-Controlled Service, Volume Up/Down, Mute, Live TV, Partner Buttons |
| Global Navigation | Available navigation controls that allow movement between first user interface and second user interface experiences. | Home, Back |
| Contextual Navigation | Navigation controls that are supported dependent upon current position in the user interface. | Select, Directional Pad, Menu |
| Media/Transport | Specialized controls for managing media playback. | Play/Pause, Rewind, Fast Forward |

Table 2 illustrates an example of a data structure that is usable by the input translator 330 in FIG. 3 and is a mapping between the buttons 424A-R and contexts to control inputs. The contexts relate to the operational modes and user interfaces.

TABLE 2

| Category | Remote Button | User Interaction | First mode 101 | Second mode 102 |
| --- | --- | --- | --- | --- |
| Global | Power | Short Press | If active, stop current activity Show first user interface home screen | If active, stop current playback Exit second user interface experience Return to first user interface home screen |

TABLE 2-continued

| Category | Remote Button | User Interaction | First mode 101 | Second mode 102 |
|---|---|---|---|---|
| Global | Speech-Controlled Service | Short Press | Show a toast that explains to use a long press for duration of utterance Remote pulses 10 times | Show a toast that explains to use a long press for duration of utterance Remote pulses 10 times |
| Global | Speech-Controlled Service | Long Press | Mic open on remote Voice chrome on screen Text-to-speech message plays Speak utterance Release the button | Mic open on remote Voice chrome on screen Text-to-speech message plays Speak utterance Release the button |
| Contextual Navigation | Directional Pad | Short Press | Unmapped (do nothing) | Click Up: Focus item above Click Down: Focus item below Click Left: Focus item on the left or back to last item Click Right: Focus item on the right or back to first item |
| Contextual Navigation | Directional Pad | Long Press | Unmapped (do nothing) | Click Up: Focus item above (repeat continuously) Click Down: Focus item below (repeat continuously) Click Left: Focus item on the left or back to last item (repeat continuously) Click Right: Focus item on the right or back to first item (repeat continuously) |
| Contextual Navigation | Center Select | Short Press | Unmapped (do nothing) | Actuate focused item |
| Contextual Navigation | Center Select | Long Press | Unmapped (do nothing) | Unmapped (do nothing) |
| Global Navigation | Back | Short Press | Dismiss alerts, notifications, and panels Otherwise, do nothing | Move interface to previous item Back to previous window (entry point focus) On home page, back to home menu item (focus state) On horizontal scroll/view menus, back/select first item On second user interface home menu item focused, no action NOTE: If on the default position of second user interface launcher, switch to first user interface home |
| Global Navigation | Back | Long Press | Not supported | Not Supported |
| Global Navigation | Home | Short Press | Within first user interface home screen, open second user interface Otherwise, open default position of first user interface home screen | Within default position of launcher, open first user interface home screen Otherwise, open default position of second user interface home screen |
| Global Navigation | Home | Long Press | Setup remote | Setup remote |

TABLE 2-continued

| Category | Remote Button | User Interaction | First mode 101 | Second mode 102 |
|---|---|---|---|---|
| Contextual Navigation | Menu | Short Press | Unmapped (do nothing) | Display context-sensitive menu for current foreground activity/focused item |
| Contextual Navigation | Menu | Long Press | Unmapped (do nothing) | Unmapped (do nothing) |
| Media/Transport | Reverse | Short Press | If media is not active, no effect Else if timecode - 00:00, go to previous track Otherwise, go to 00:00 | Depends upon app provider implementation |
| Media/Transport | Reverse | Long Press | No action | Depends upon app provider implementation |
| Media/Transport | Play/Pause | Short Press | Toggle play/pause state | Toggle play/pause state |
| Media/Transport | Play/Pause | Long Press | Not supported | Not supported |
| Media/Transport | Skip | Short Press | If media is not active, no effect Otherwise, go to next track | Depends upon app provider implementation |
| Media/Transport | Skip | Long Press | No action | Depends upon app provider implementation |
| Global | Mute | Short Press | Toggle mute setting on/off | Toggle mute setting on/off |
| Global | Mute | Long Press | Toggle mute setting on/off | Toggle mute setting on/off |
| Global | Volume Up | Short Press | Increase volume level by one step | Increase volume level by one step |
| Global | Volume Up | Long Press | Increase volume level by one step every N ms | Increase volume level by one step every N ms |
| Global | Volume Down | Short Press | Decrease volume level by one step | Decrease volume level by one step |
| Global | Volume Down | Long Press | Decrease volume level by one step every N ms | Increase volume level by one step every N ms |
| Global | Live TV | Short Press | Open second user interface with focus on live TV grid | Open second user interface with focus on live TV grid |
| Global | Live TV | Long Press | Not supported | Not supported |
| Global | Partner Buttons | Short Press | If corresponding partner app is installed, open app within second user interface Otherwise, open app store page for partner app | If corresponding partner app is installed, open app within second user interface Otherwise, open app store page for partner app |
| Global | Partner Buttons | Long Press | Not supported | Not supported |

Figure 5:
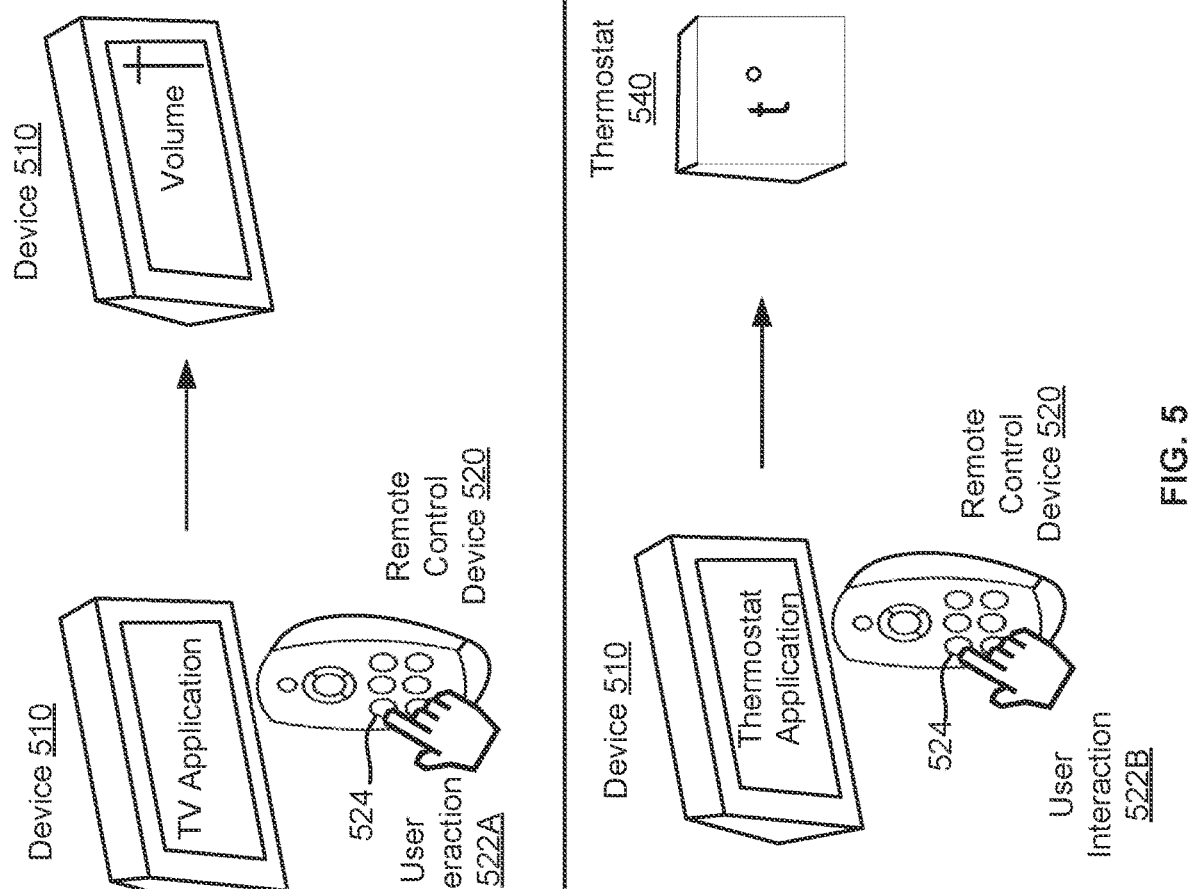
FIG. 5 illustrates an example of controlling different devices based on context-based control inputs, according to embodiments of the present disclosure.

FIG. 5 illustrates an example of controlling different devices based on context-based control inputs, according to embodiments of the present disclosure. As illustrated in FIG. 5, a device 510 can operate in a first mode (e., the mode 102 of FIG. 1) corresponding to a television experience and present a first user interface that corresponds to the first mode. The user interface can be presented by a television application that supports different content-related actions (e.g., stream movies and/or other content from streaming services, content playback controls, change a volume, etc.). The first user interface can be controllable by one or more modalities, such as by a remote control device 520, touch-screen input, and/or speech input. The device 510 may receive a signal corresponding to a user interaction 522A selecting a button 524 of the remote control device 520 while the first user interface includes a home screen (or, similarly, data corresponding to any other type of input via the first user interface). The button 524 may be a volume up button. The device 510 can determine a context that indicates the first user interface is presented and/or a first user interface position (e.g., the television application). Data corresponding to the signal indicating that the button 524 has been selected and the context can be mapped to a control input: increase to a volume output. In response to the control input, the device 510 can execute an action to increase the volume output of the device 510.

In an example, the device 510 may also operate in a second mode (e.g., the mode 101 of FIG. 1) and present a second user interface that corresponds to the second mode. The second user interface can enable the control of a thermostat 540 based on user input to a thermostat application executable on the device 510. The device 510 can then receive a signal corresponding to a user interaction 522B selecting the button 524 (e.g., the volume up button) while the second user interface presents a page for the thermostat application (or, similarly, data corresponding to any other type of input via the second user interface). The device 510 can determine a context that indicates the thermostat application is presented. Data corresponding to the signal indicating that the button 524 has been selected and the context can be mapped to another control input: a temperature increase. In response to this control input, the device 510 can execute an action to increase a temperature setting for the thermostat 540. For example, the device 510 can send a command to the thermostat 540 indicating the temperature increase so that the thermostat 540 can change the temperature setting accordingly.

Figure 6:
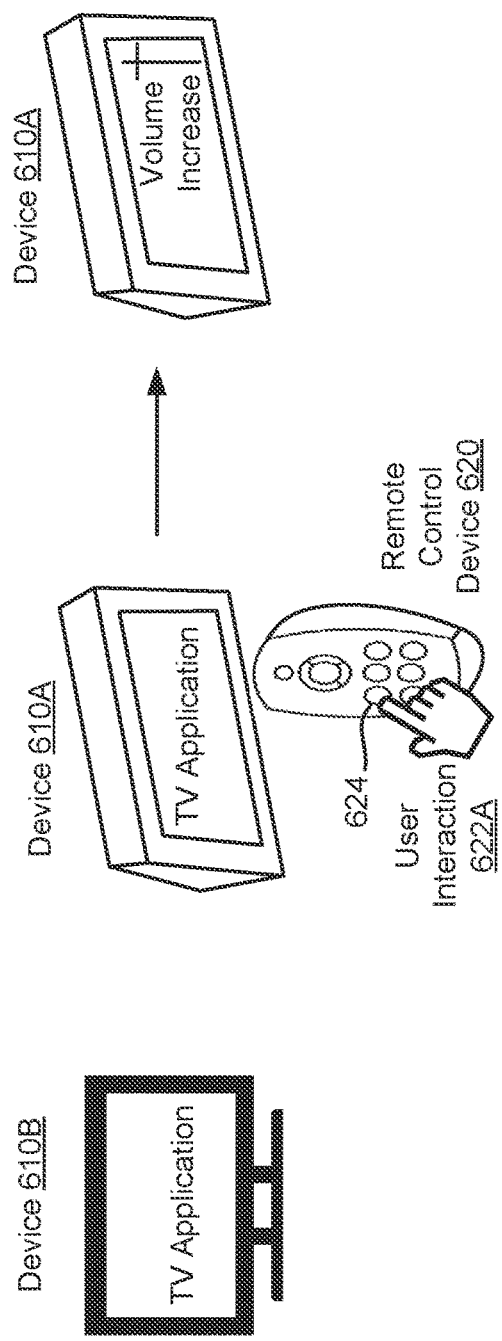
FIG. 6 illustrates another example of controlling different devices based on context-based control inputs, according to embodiments of the present disclosure.
Figure 6:
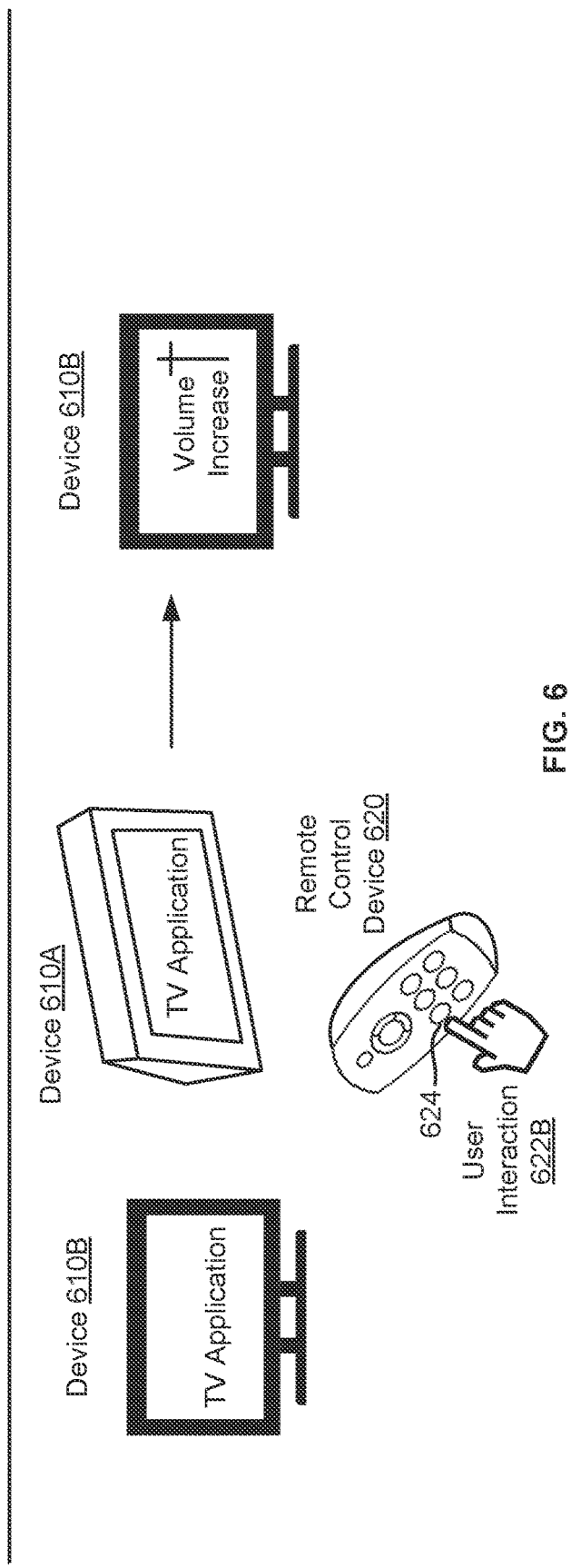

FIG. 6 illustrates another example of controlling different devices based on context-based control inputs, according to embodiments of the present disclosure. As illustrated in FIG. 6, can operate in a first mode (e., the mode 102 of FIG. 1) corresponding to a television experience and present a first user interface that corresponds to the first mode. The user interface can be presented by a television application that supports different content-related actions (e.g., stream movies and/or other content from streaming services, content playback controls, change a volume, etc.). The first user interfaces can be controllable by one or more modalities, such as by a remote control device 620, touchscreen input, and/or speech input. The device 610A may receive a signal corresponding to a user interaction 622A selecting a button 624 of the remote control device 620 while the first user interface includes a home screen. The button 624 may be a volume up button. The device 610A can determine a context that indicates a user is facing the device 610A and/or that the user is closer in proximity to the device 610A than another device 610B and that the device 610A the first user interface includes the home screen. Data corresponding to the signal indicating that the button 624 has been selected and the context can be mapped to a control input: a volume increase. In response to the control input, the device 610A can execute an action to increase the volume output of the device 610A.

The device 610A can also receive a signal corresponding to a user interaction 622B selecting the button 624 (e.g., volume up button) while the user is facing the other device 610B (or, similarly, data corresponding to any other type of input). The device 610A can determine a context that indicates that the user is facing the device 610B (e.g., a user view towards the device 610B), a user proximity to the device 610B, and/or that the user is closer in proximity to the device 610B than the device 610A (e.g., a user proximity to the device 610B). Data corresponding to the signal indicating that the button 624 has been selected and the context can be mapped to a control input: no action to be executed (e.g., ignore the user input) or to instruct the device 610B. In case the control input is to ignore the user input, the device 610A performs no further actions in response to the signal. Instead, the device 610B can similarly receive and process a signal as described herein above to increase its volume output. In case the control input is to instruct the device 610B, the device 610A can send a command to the device 610B to cause the device 610B to execute an action to increase the volume output of the device 610B.

Different techniques are possible to detect the user view, user presence, and/or user proximity. One example technique for the user view can use optical sensors (e.g., cameras) to generate images showing a user face and processing these images using image detection algorithms to determine whether the user is facing the device 610A or not. Another example technique can involve eye-tracking systems. An example technique for user presence can involve image processing or sensor systems (including optical and/or non-optical sensors). One example technique for the user proximity can use measurement of the signal (e.g., received signal strength indicator (RSSI)), whereby the closer the user is, the larger the RSSI is and/or the processing of images or sensor data.

In another example, a user interaction corresponding to a selection of an application shown in the first user interface of the device 610A via the remote control device 620 can be associated with an execution of an action of launching the application without presenting a virtual remote control on the device 610B. But a user interaction corresponding to the selection of the application via a touchscreen of the device 610A (e.g., in a second mode) can be associated with an execution of an action of launching the application and presenting the virtual remote control.

In another example, a user interaction corresponding to a selection of the button 624 (e.g., a short press of the button 624) on the remote control device 620 while the device 610A presents the home screen of the first user interface can be associated with an execution of an action of navigating from the first user interface to a second user interface of a second mode. But a user interaction corresponding to a second selection of the button 624 (e.g., a long press of the button 624) can be associated with an execution of an action for presenting of an option to communicatively couple the device 610A with another device (e.g., with another remote control device).

In another example, a user interaction corresponding to a selection of the button 624 (e.g., a speech-controlled service button) on the remote control device 620 while the device 610A presents a user interface can be associated with an execution of an action of presenting a notification about a use of the button. For instance, the notification may indicate that the button 624 needs to be long pressed for the device 610A to execute a speech-controlled action.

In another example, a user interaction corresponding to a selection of the button 624 (e.g., a back button) on the remote control device 620 while the device 610A presents a first user interface can be associated with an execution of an action of navigating in the first user interface. But another user interaction selecting the button 624 that is received while the second user interface is presented and includes a notification can be associated with an execution of an action of a dismissal of the notification.

Figure 7:
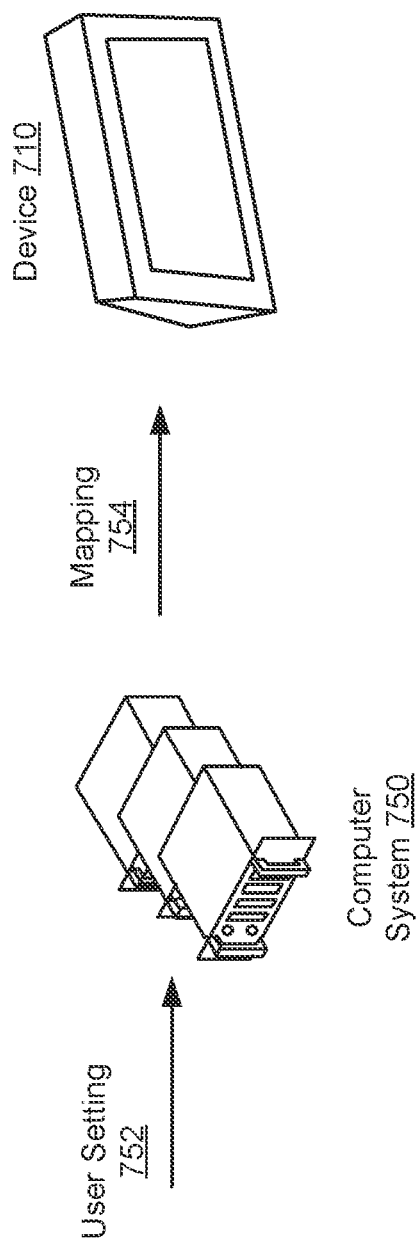
FIG. 7 illustrates an example of generating a mapping for context-based control inputs for a device, according to embodiments of the present disclosure.

FIG. 7 illustrates an example of generating a mapping 754 for context-based control inputs for a device, according to embodiments of the present disclosure. A computer system 750, such as a set of servers, can receive data indicating a user setting 752 that maps a particular user input and context are to a particular control input. This data may be received from a user device, such as a mobile phone, laptop, or desktop, whereby the user device and the computer system 750 interface over a data network (e.g., via a web interface or an application programming interface). In an example, the user device can be operated by an operator of a service provider to specify the user setting 752 across multiple devices. In another example, the user device is specific to a user account of a user and is operated by the user to specify the user setting 752 applicable to the user account. In this example, the user device may, but need not, be the same as a device 720 and the user can be logged in onto a device 710 based on the user account. The user setting 752 is then applied to controlling the device 752. Based on the user setting 752, the computer system 750 can generate a mapping 754 that associates the particular user input and context with the particular control input. The computer system 750 can send the mapping 754 to the device 710, and the device 710 can look up the mapping 754 upon receiving a user input and determining a context to determine the control input.

Although a user setting 752 is described herein above for generating a mapping 754, the embodiments of the present disclosure are not limited as such. For example, the computer system 750 can receive training data and train a machine learning model. Rather than sending the mapping 754, the machine learning model can be sent to the device 710. Additional training data can be collected back by the computer system 750 from the device 710 and other devices to further train the machine learning model and send machine learning model updates to the device 710. Additionally, or alternatively, the device 710 can generate additional training data based on user interactions therewith to locally further train the machine learning model such that this machine learning model is personalized.

In another example, rather than sending the mapping 754 and/or the machine learning model to the device 710, the computer system 750 can store and maintain them locally. In this example, upon generating data that represents a user interaction, the device 710 can send the data to the computer system 750 that, in turn, determines the control input that is to be used and sends a response to the device 710 indicating the control input. In this case, the data received from the device 710 can indicate one or more contexts. Additionally, or alternatively, the computer system 750 can maintain one or more contexts (e.g., a device context of the device 710, a user context based on a user account used for a login to the device 710, etc.). In both cases (e.g., whether a context is determined by the device 710 and indicated to the computer system 750 and/or whether a context is determined by the computer system 750 absent input from the device 710), the computer system 750 uses the context(s) to determine the control input from the mapping 754 or as part of the input to the machine learning model.

Figure 8:
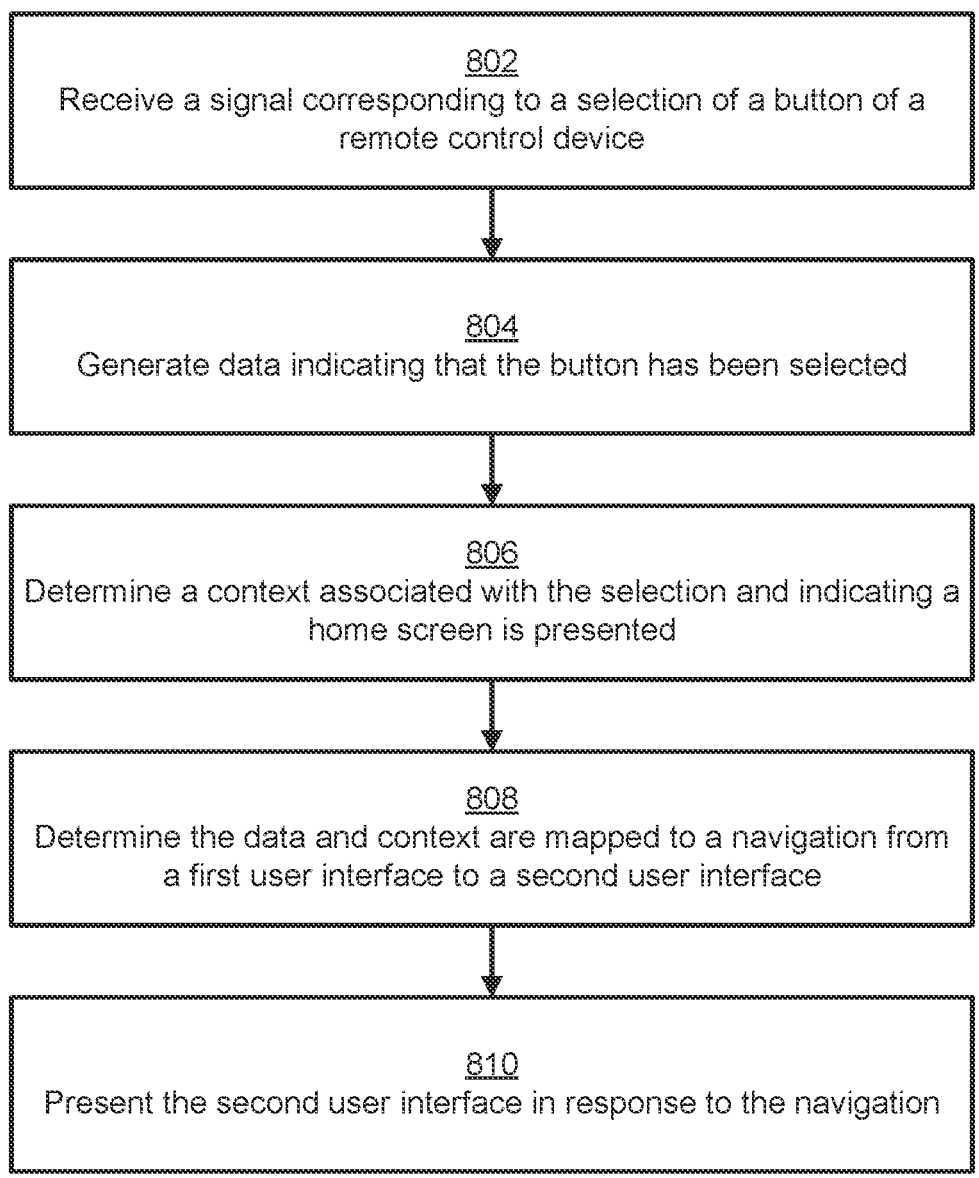
FIG. 8 illustrates an example of a flow for navigating between user interfaces based on context-based control inputs, according to embodiments of the present disclosure.
Figure 9:
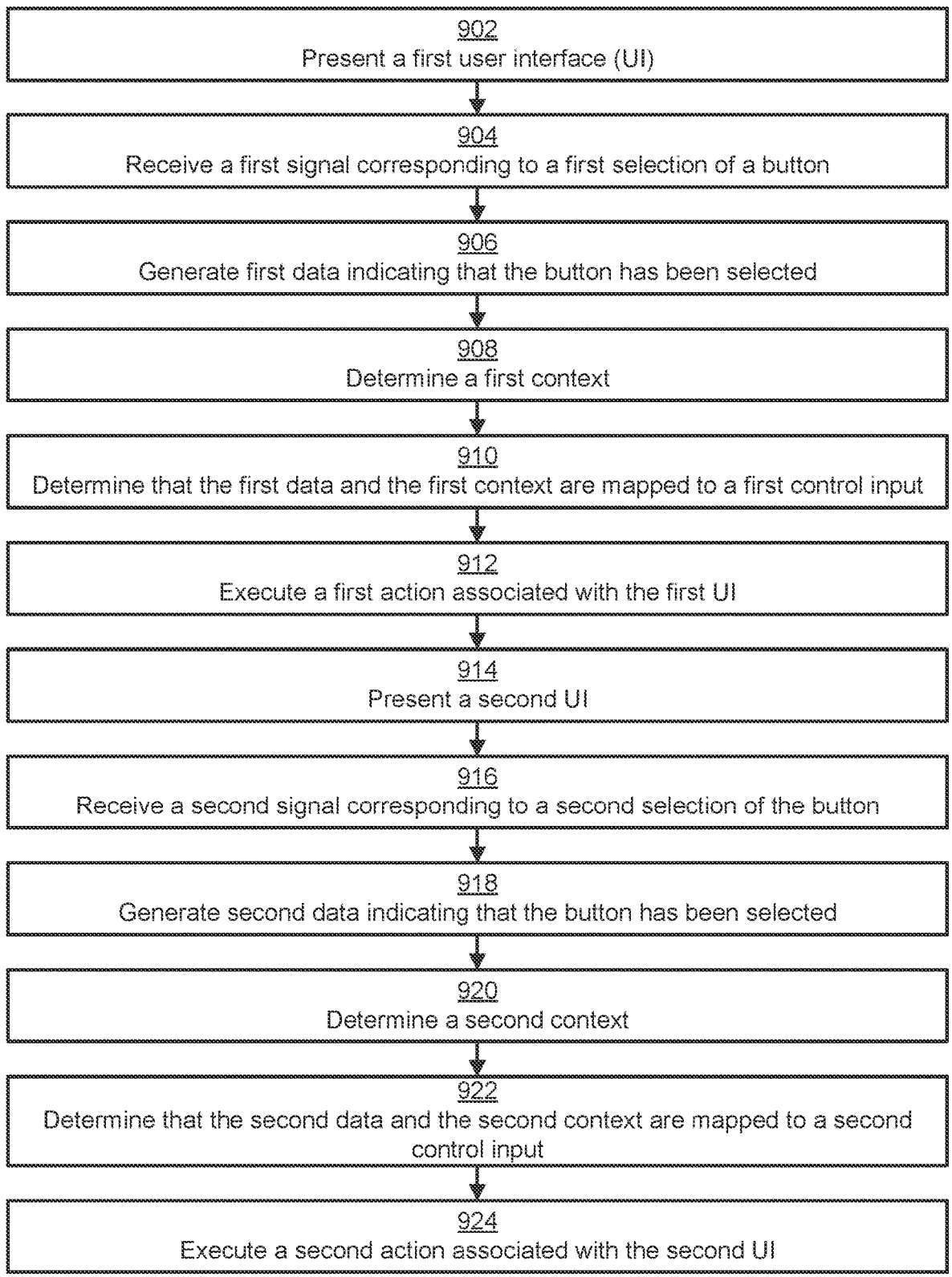
FIG. 9 illustrates an example of a flow for context-based control inputs for a device, according to embodiments of the present disclosure.

FIGS. 8-9 illustrate examples of flows for context-based control inputs, according to embodiments of the present disclosure. Operations of the flows can be performed by a device with a display, such as the device 110. Some or all of the instructions for performing the operations can be implemented as hardware circuitry and/or stored as computer-readable instructions on a non-transitory computer-readable medium of device. As implemented, the instructions represent modules that include circuitry or code executable by processor(s) of the device. The use of such instructions configures the device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

FIG. 8 illustrates an example of a flow for navigating between user interfaces on a device based on context-based control inputs, according to embodiments of the present disclosure. In an example, the flow includes operation 802, where the device receives a signal corresponding to a selection of a button of a remote control device. The signal can be received from the remote control device while a first user interface is presented on the device. Of course, other types of signals can be received and processed according to the flow. For example, a touchscreen signal can be received based on touchscreen input, or an audio signal can eb received based on an audio detection by a set of microphones.

In an example, the flow includes operation 804, where the device generates data indicating that the button has been selected. If other signals are received, the device can generate data indicating parameters of the user interaction (e.g., the type and location of a gesture on a touchscreen, an intent and a token determined from natural language processing of a speech input, etc.).

In an example, the flow includes operation 806, where the device determines a context associated with the selection and indicating a home screen is presented. The home screen can be a home screen of the first user interface that provides a set of applications that are executable on the device. The context may additionally indicate a user interface position. As described herein above, other contexts can be determined and can be any or a combination of a user context, a device context, an application context, etc.

In an example, the flow includes operation 808, where the device determines the data and context are mapped to a navigation from the first user interface to a second user interface. The device can lookup mapping data indicating that the data and context are mapped to the navigation from the first user interface to the second user interface. The second user interface can provide another set of applications that are executable on the device. As described herein above, other control inputs can be determined based on the data and the context(s).

In an example, the flow includes operation 810, where the device presents the second user interface in response to the navigation. The device may present a home screen of the second user interface. As described herein above, other actions can be executed by the device or can be triggered by the device for execution on another device.

FIG. 9 illustrates an example of a flow for context-based control inputs for a device, according to embodiments of the present disclosure. In an example, the flow includes operation 902, where the device presents a first user interface. The device can include a set of microphones and a touchscreen display. The first user interface is presented on the touchscreen display and provides a first home screen for a first set of applications executable on the device. The first user interface can be controllable via a remote control device.

In an example, the flow includes operation 904, where the device receives a first signal corresponding to a first selection of a button. The first signal can be received from the remote control device that includes the button while the first user interface is presented.

In an example, the flow includes operation 906, where the device generates first data indicating that the button has been selected. The data can include an identifier of a type (e.g., home, back, power, volume up/down, menu, etc.) of the button that has been selected.

In an example, the flow includes operation 908, where the device determines a first context. The first context may include one or more of a user context, a device context, a user interface context, an application context, or an environmental context. For instance, the first context can indicate that the first user interface is presented and a first user interface position, which may be an application that is currently executing on the device, a presentation of the home screen of the first user interface, or another page of the first user interface that is being presented. In an example, the flow includes operation 910, where the device determines that the first data and the first context are mapped to a first control input. The device can lookup mapping data indicating that the first data and the first context are mapped to the first control input. Alternatively, the device may input the first data and the first context into a machine learning model that generates an output indicating the first control input.

In an example, the flow includes operation 912, where the device executes a first action associated with the first user interface. The first action may be a navigation to another page, a navigation to the home screen of the first user interface, a navigation to a second user interface, a sending of a command to another device for performing an action at the other device, or any other suitable action.

In an example, the flow includes operation 914, where the device presents a second user interface. The second user interface is presented on the touchscreen display and provides a second home screen for a second set of applications executable on the device. The second user interface can be controllable via speech input received by the set of microphones and touchscreen input received by the touchscreen display.

In an example, the flow includes operation 916, where the device receives a second signal corresponding to a second selection of the button. The second signal can be received from the remote control device that includes the button while the second user interface is presented.

In an example, the flow includes operation 918, where the device generates second data indicating that the button has been selected.

In an example, the flow includes operation 920, where the device determines a second context. The second context may include one or more of a user context, a device context, a user interface context, an application context, or an environmental context. For instance, the second context can indicate that the second user interface is presented and a second user interface position, which may be an application that is currently executing on the device, a presentation of the home screen of the second user interface, or another page of the second user interface that is being presented.

In an example, the flow includes operation 922, where the device determines that the second data and the second context are mapped to a second control input. The device can lookup mapping data indicating that the second data and the second context are mapped to the second control input. Alternatively, the device may input the second data and the second context into a machine learning model that generates an output indicating the second control input.

In an example, the flow includes operation 924, where the device executes a second action associated with the second user interface. The second action may be a navigation to another page, a navigation to the home screen of the second user interface, a navigation to the first user interface, a sending of a command to another device for performing an action at the other device, or any other suitable action.

Figure 10:
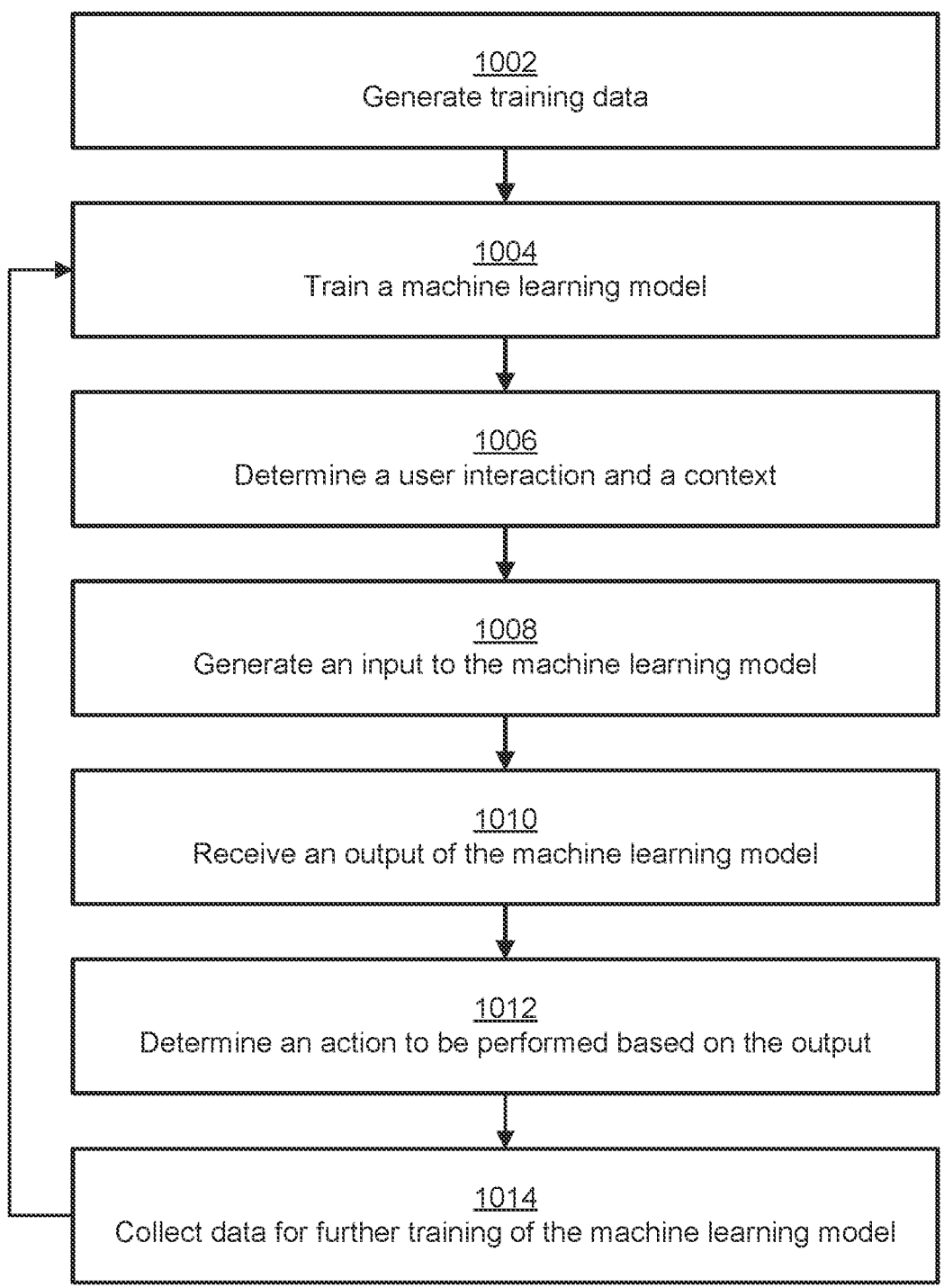
FIG. 10 illustrates an example of a flow for training and using a machine learning model for context-based control inputs for a device, according to embodiments of the present disclosure.

FIG. 10 illustrates an example of a flow for training and using a machine learning model for context-based control inputs of a device, according to embodiments of the present disclosure. Operations of the flow can be performed by a computer system that can include a device and/or a set of servers (e.g., the computer system 750 of FIG. 7). The flow can be implemented by the device, where the device can learn a mapping of user interactions and contexts to control input. Additionally, or alternatively, the flow can be implemented by the set of servers, where the set of servers can learn a mapping of user interactions and contexts to control input and send this mapping as data to the device. Some or all of the instructions for performing the operations can be implemented as hardware circuitry and/or stored as computer-readable instructions on a non-transitory computer-readable medium of device. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 1002, where the computer system (e.g., the set of servers) generates training data. For example, historical user interactions and contexts, corresponding actions, and corresponding feedback (e.g., explicit user feedback indicating that an executed action was correct or incorrect, or implicit feedback whereby a user re-uses the same type of input associated with the same context in a short period of time in an attempt to execute another action) are tracked over time (upon user permissions and applicable law). The corresponding feedback (e.g., correct and incorrect labels) can be used as ground truth.

In an example, the flow includes operation 1004, where the computer system e.g., the set of servers) trains a machine learning model. The machine learning model can receive the training data and output predicted control inputs until a loss function associated with the machine learning model is minimized. For supervised training, each user interaction and context pair of the training data can be associated with an optimum control input that is defined and labeled for use as ground truth. The machine learning model is trained to predict, for each pair of user interactions and contexts, a control input, and the loss function is computed based on a difference between the predicted control input and the ground truth-labeled control input for that user interaction and context pair. In particular, the loss function can include a penalty where the value of the penalty depends on the difference. Upon the training completion, the machine learning model can be stored by the device.

In an example, the flow includes operation 1006, where the computer system (e.g., the device and/or the set of servers) determines a user interaction and a context. The user interaction and the context can be received once the machine learning model has been trained. The user interaction may be a selection of a button of a remote control device, speech input provided to the computer system, or a touchscreen input to the computer system. The context can be a user context, computer system context, user interface context, application context, and/or environmental context.

In an example, the flow includes operation 1008, where the computer system (e.g., the device and/or the set of servers) generates an input to the machine learning model. The input can include or be based on the user interaction and the context.

In an example, the flow includes operation 1010, where the computer system (e.g., the device and/or the set of servers) receives an output of the machine learning model. The output indicates a control input based on the input. The control input may be determined from predetermined control inputs.

In an example, the flow includes operation 1012, where the computer system (e.g., the device and/or the set of servers) determines an action to be performed based on the output. The action may be a navigation to another page, a navigation to the home screen of a user interface, a navigation to a particular user interface, a sending of a command to another device for performing an action at the other device, or any other suitable action.

In an example, the flow includes operation 1012, where the computer system (e.g., the device) collects data for further training of the machine learning model. This data can represent explicit feedback or implicit feedback to the control input that was determined by the machine learning model and/or the action that resulted from the control input. The further training is indicated in the flow by the loop back to operation 1004. In an example, the further training can be performed locally by the device. In another example, the further training can be on the set of servers. In particular, the data can be sent to the set of servers that then further trains the machine learning model and sends a machine learning model update (e.g., an update to the weights of the node connections of the machine learning model) to the device.

Figure 11:
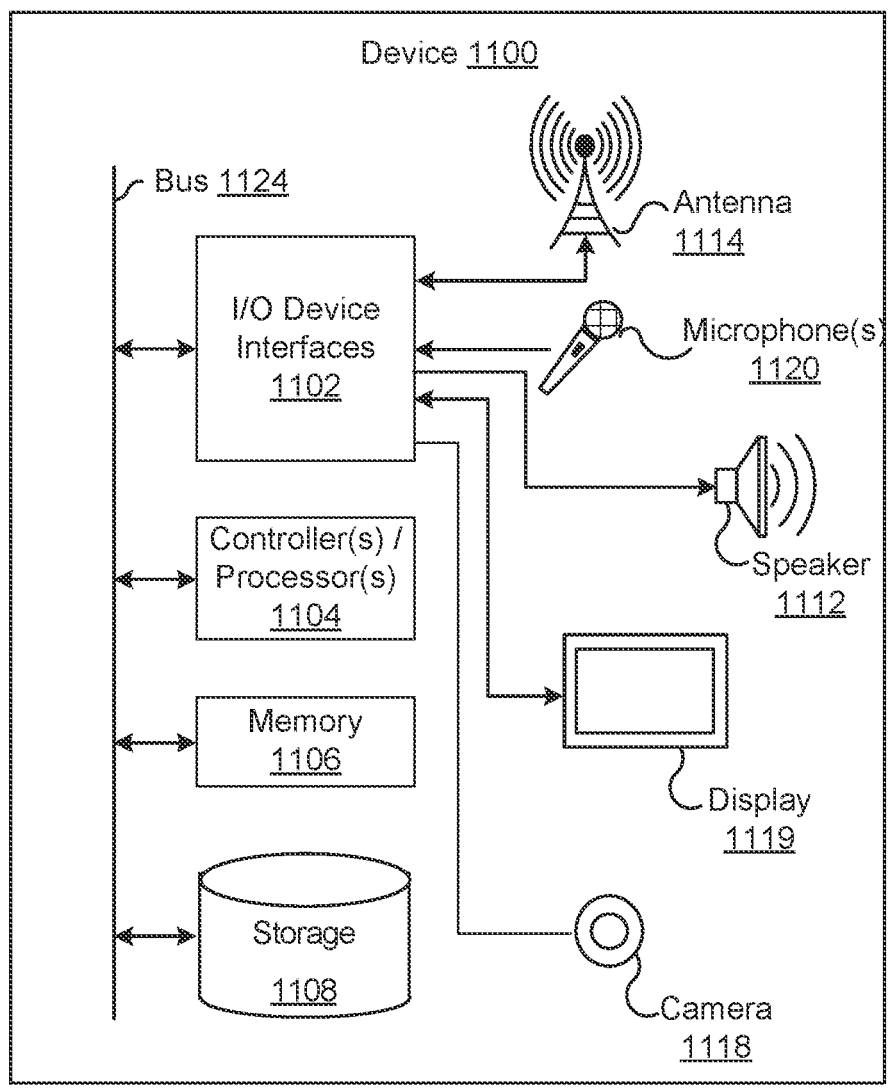
FIG. 11 illustrates an example of components of a device, in accordance with embodiments of the present disclosure.
Figure 12:
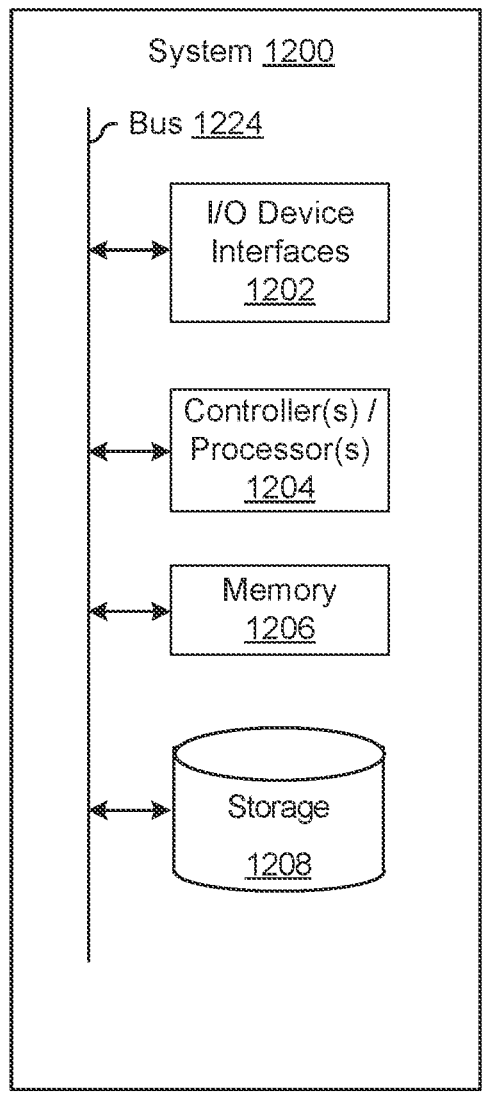
FIG. 12 illustrates an example of components of a computer system, in accordance with embodiments of the present disclosure.

FIG. 11 illustrates an example of components of a device 1100 (e.g., an example of the devices described herein above), in accordance with embodiments of the present disclosure. FIG. 12 illustrates an example of components of a computer system 1200 (e.g., an example of the computer systems described herein above), in accordance with embodiments of the present disclosure. The computer system 1200 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems may be included in the computer system 1200 of the present disclosure, such as one or more natural language processing (NLP) systems for performing automatic speech recognition (ASR) processing, one or more NLP systems for performing natural language understanding (NLU_processing, etc. In operation, each of these systems may include computer-readable and computer-executable instructions that reside on the computer system 1200.

Each of the device 1100 and the computer system 1200 may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random-access memory (RAM), non-volatile read-only memory (ROM), non-volatile magneto-resistive memory (MRAM), and/or other types of memory. Each of the device 1100 and the computer system 1200 may also include a data storage component (1108/1208) for storing data and controller/processor-executable instructions. Each data storage component (1108/1208) may individually include one or more non-volatile storage types, such as magnetic storage, optical storage, solid-state storage, etc. The data storage component 1108 of the device 1100 may also include a data store as described herein above. Each of the device 1100 and the computer system 1200 may also be connected to removable or external non-volatile memory and/or storage (such as a removable memory card, memory key drive, networked storage, etc.) through respective input/output device interfaces (1102/1202).

Computer instructions for operating each of the device 1100 and the computer system 1200 and its various components may be executed by the respective controller(s)/processor(s) (1104/1204), using the memory (1106/1206) as temporary "working" storage at runtime. Computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each of the device 1100 and the computer system 1200 may include input/output device interfaces (1102/1202). A variety of components may be connected through the input/output device interfaces (1102/1202). Additionally, each of the device 1100 and the computer system 1200 may include an address/data bus (1124/1224) for conveying data among components of the respective device. Each component within the device 1100 may also be directly connected to other components in addition to (or instead of) being connected to other components across the bus (1124/1224).

Referring to FIG. 11, the device 1100 may include input/output device interfaces 1102 that connect to a variety of components, such as an audio output component such as a speaker 1112, a wired headset or a wireless headset (not illustrated), or other component capable of outputting audio. The device 1100 may also include an audio capture component. The audio capture component may be, for example, a microphone 1120 or array of microphones, a wired headset, or a wireless headset (not illustrated), etc. If an array of microphones is included, approximate distance to a sound's point of origin may be determined by acoustic localization based on time and amplitude differences between sounds captured by different microphones of the array. The device 1100 may additionally include a display 1116 for displaying content. The device 1100 may further include a camera 1118.

Via antenna(s) 1114, the input/output device interfaces 1102 may connect to one or more networks 129 via a wireless local area network (WLAN) (such as WiFi) radio, Bluetooth, and/or wireless network radio, such as a radio capable of communication with a wireless communication network, such as WiMAX network, 4G network, 5G network, etc. A wired connection, such as Ethernet, may also be supported. Through network(s), the system may be distributed across a networked environment. The I/O device interface (1102/1202) may also include communication components that allow data to be exchanged between devices, such as different physical servers in a collection of servers or other components.

The components of each of the device 1100 and the computer system 1200 may include their own dedicated processors, memory, and/or storage. Alternatively, one or more of the components of the device 1100 and the computer system 1200 may utilize the I/O interfaces (1102/1202), processor(s) (1104/1204), memory (1106/1206), and/or storage (1108/1208) of the device 1100 and the computer system 1200, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 1100 and the computer system 1200, as described herein, are illustrative, and may be located as a stand-alone device or may be included, in whole or in part, as a component of a larger device or system.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
a remote control device comprising a button; and
a display device comprising:
a set of microphones;
a touchscreen display;
one or more processors; and
one or more memory storing instructions that, upon execution by the one or more processors, configure the display device to:
present, on the touchscreen display, a first user interface (UI) providing a first home screen for a first plurality of applications executable on the display device, the first UI controllable via the remote control device;
receive, from the remote control device while the first UI is presented, a first signal corresponding to a first selection of the button;
generate first data indicating that the button has been selected;
determine a first context indicating that the first UI is presented and a first UI position;
determine that the first data and the first context are mapped to a first control input;
execute, in response to the first control input, a first action associated with the first UI;
present, on the touchscreen display, a second UI providing a second home screen for a second plurality of applications executable on the display device, the second UI controllable via speech input received by the set of microphones and touchscreen input received by the touchscreen display;
receive, from the remote control device, a second signal corresponding to a second selection of the button;
generate second data indicating that the button has been selected;
determine a second context indicating a second UI position;
determine that the second data and the second context are mapped to a second control input; and
execute, in response to the second control input, a second action associated with the second UI.

2. The system of claim 1, wherein the first UI position corresponds to a first page that is different from the first home screen and that is in the first UI, and wherein the first action corresponds to navigating from the first page to the first home screen.

3. The system of claim 2, wherein the second UI position corresponds to the first home screen, and wherein the second action corresponds to navigating from the first home screen to the second home screen.

4. The system of claim 3, wherein the one or more memory store additional instructions that, upon execution by the one or more processors, configure the display device to:

receive, from the remote control device while the second UI is presented, a third signal corresponding to a third selection of the button;

generate third data indicating that the button has been selected;

determine a third context associated with the third selection and indicating that the second home screen is presented;

determine that the third data and the third context are mapped to a navigation from the second UI to the first UI; and present, in response to the navigation, the first UI.

5. A method implemented by a device, the method comprising:

presenting, on a touchscreen display device configured to receive remote control inputs from at least one microphone or a touchscreen display, a first user interface (UI) associated with a first plurality of applications executable on the device, the first UI controllable via a remote control device;

determining, while the first UI is presented, a first signal corresponding to a first instance of a first user input received via the remote control device and associated with a first context;

determining a first control input of a plurality of predetermined control inputs based at least in part on the first signal and the first context;

causing execution of a first action based at least in part on the first control input;

present, on the touchscreen display, a second UI associated with a second plurality of applications executable on the device, the second UI controllable via speech input received by the at least one microphone or touchscreen input received by the touchscreen display;

determining, while the second UI is presented, a second signal corresponding to a second instance of the first user input and associated with a second context that is different from the first context;

determining a second control input of the plurality of predetermined control inputs based at least in part on the second signal and the second context, the second control input being different from the first control input; and causing execution of a second action based at least in part on the second control input.

6. The method of claim 5 further comprising:

determining that the first signal is received while a first page is presented in the first UI, wherein the first context indicates a first UI position on the first page;

determining that a first navigation to a first home screen of the first UI is to be executed based at least in part on the first signal and the first context, wherein the first control input corresponds to the first navigation; and presenting the first home screen based at least in part on the execution of the first action.

7. The method of claim 6 further comprising:

determining that the second signal is received while the first home screen is presented in the first UI, wherein the first context indicates a second UI position on the first home screen;

determining that a second navigation to a second home screen of a second UI is to be executed based at least in part on the second signal and the second context, wherein the first control input corresponds to the first navigation, wherein the second control input corresponds to the second navigation, wherein the second UI is associated with a second plurality of applications executable on the device; and presenting the second home screen based at least in part on the execution of the second action.

8. The method of claim 5 further comprising:

sending a command to another device, wherein the first action is executed by the device, and wherein the second action is executed by the other device based at least in part on the command.

9. The method of claim 5 further comprising:

determining a third signal corresponding to a third instance of the first user input;

determining a third context associated with the third signal and being different from the first context; and determining that no action is to be executed based at least in part on the third context and the third signal, wherein a third action is executed on another device based at least in part on the third context and the third signal.

10. The method of claim 9 further comprising:

determining at least one of a user proximity to the device, a user presence relative to the device, or a user view of the device, wherein the third context indicates the at least one of the user proximity, the user presence, or the user view.

11. The method of claim 5 further comprising:

generating an input to a machine learning model based at least in part on the first signal and the first context, wherein the machine learning model is trained to indicate control inputs; and determining an output of the machine learning model based at least in part on the input, wherein the output indicates the first control input.

12. The method of claim 5 further comprising:

storing mapping data indicating that the signal and the first context are to be mapped to the first control input, wherein the mapping data is generated based at least in part on input data of a user device indicating a mapping of the first user input and the first context to the first control input; and looking up the mapping data to determine the first control input.

13. A device comprising:

one or more processors; and one or more memory storing instructions that, upon execution by the one or more processors, configure the device to:

present, on a touchscreen display device configured to receive remote control inputs from at least one microphone or a touchscreen display, a first user interface (UI) associated with a first plurality of applications executable on the device, the first UI controllable via a remote control device;

determine, while the first UI is presented, a first signal corresponding to a first instance of a first user input received via the remote control device and associated with a first context;

determine a first control input of a plurality of predetermined control inputs based at least in part on the first signal and the first context;

cause execution of a first action based at least in part on the first control input;

present, on the touchscreen display, a second UI associated with a second plurality of applications executable on the device, the second UI controllable via speech input received by the at least one microphone or touchscreen input received by the touchscreen display;

determine, while the second UI is presented, a second signal corresponding to a second instance of the first user input and associated with a second context that is different from the first context;

determine a second control input of the plurality of predetermined control inputs based at least in part on the second signal and the second context, the second control input being different from the first control input; and cause execution of a second action based at least in part on the second control input.

14. The device of claim 13, wherein the first signal corresponds to a first selection of a button on the remote control device, and wherein the execution of the first action includes a presentation of a first notification in the first UI about a use of the button, wherein the second context indicates that the second signal is received while a second UI associated with a second plurality of applications is presented, wherein the second signal corresponds to a second selection of the button, and wherein the execution of the second action includes a presentation of a second notification in the second UI about the use of the button.

15. The device of claim 13, wherein the first signal corresponds to a first selection of a navigation button on the remote control device, and wherein the execution of the first action includes a navigation in the first UI, wherein the second context indicates that the second signal is received while a second UI associated with a second plurality of applications is presented, wherein the second signal corresponds to a second selection of the navigation button, and wherein the execution of the second action includes a determination that no navigation is to be performed in the second UI.

16. The device of claim 13, wherein the first signal corresponds to a first selection of a button on the remote control device, and wherein the execution of the first action includes a navigation in the first UI, wherein the second context indicates that the second signal is received while a second UI associated with a second plurality of applications is presented and includes a notification, wherein the second signal corresponds to a second selection of the button, and wherein the execution of the second action includes a dismissal of the notification.

17. The device of claim 13, wherein the first signal corresponds to a first selection of a button on the remote control device, and wherein the execution of the first action includes a navigation from the first UI to a second UI associated with a second plurality of applications, wherein the second signal corresponds to a second selection of the button, and wherein the execution of the second action includes a presentation of an option to communicatively couple the device with another device.

18. The device of claim 13, wherein the first context includes at least one of a user context, a device context, a UI context, an application context, or an environmental context.

19. The device of claim 13, wherein the first signal corresponds to a selection of an application shown in the first UI via the remote control device, wherein the execution of the first action includes launching the application without presenting a virtual remote control, wherein the second signal corresponds to the selection of the application via a touchscreen, wherein the execution of the second action includes launching the application and presenting the virtual remote control.

20. The device of claim 13, wherein the first action is associated with the first UI and the second action is associated with the second UI.

\* \* \* \* \*